US007158962B2

(12) United States Patent
Nelson

(10) Patent No.: US 7,158,962 B2
(45) Date of Patent: Jan. 2, 2007

(54) SYSTEM AND METHOD FOR AUTOMATICALLY LINKING ITEMS WITH MULTIPLE ATTRIBUTES TO MULTIPLE LEVELS OF FOLDERS WITHIN A CONTENT MANAGEMENT SYSTEM

(75) Inventor: Kenneth Carlin Nelson, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 10/305,751

(22) Filed: Nov. 27, 2002

(65) Prior Publication Data

US 2004/0103102 A1    May 27, 2004

(51) Int. Cl.
*G06F 7/00* (2006.01)
(52) U.S. Cl. .................. 707/2; 707/1; 707/7; 707/101; 707/102
(58) Field of Classification Search .............. 707/2, 707/6, 7, 101, 102, 103 R, 1
See application file for complete search history.

(56) References Cited

U.S. PATENT DOCUMENTS

| 5,710,900 | A | 1/1998 | Anand et al. ............... 395/339 |
| 5,734,893 | A | 3/1998 | Li et al. ..................... 395/615 |
| 5,809,297 | A | 9/1998 | Kroenke et al. ............ 395/613 |
| 5,819,295 | A | 10/1998 | Nakagawa et al. ......... 707/203 |
| 5,899,995 | A | 5/1999 | Millier et al. ............... 707/102 |
| 5,921,582 | A | 7/1999 | Gusack ......................... 283/67 |
| 5,987,471 | A | 11/1999 | Bodine et al. .............. 707/103 |
| 5,995,975 | A | 11/1999 | Malcolm .................... 707/103 |
| 6,226,630 | B1 | 5/2001 | Billmers ........................ 707/3 |
| 2001/0054042 | A1 | 12/2001 | Watkins et al. ............. 707/100 |

FOREIGN PATENT DOCUMENTS

| EP | 0322104 A2 | 8/1989 |
| EP | 0704810 B1 | 4/1996 |
| WO | WO99/00724 | 1/1999 |

* cited by examiner

OTHER PUBLICATIONS

O'Hara et al., The Big Basics Book of Windows 95, copyright 1997 by Que Corporation, second edition, pp. 90 and 91.*

*Primary Examiner*—Tim Vo
*Assistant Examiner*—Hung Pham
(74) *Attorney, Agent, or Firm*—Samuel A. Kassatly

(57) ABSTRACT

A system, method, and computer program product are provided for automatically linking items with multiple attributes to multiple levels of folders within a content management system. The present system extends automatic linking to support multiple levels of folders and multiple attributes. One feature of the present system is to supplement the implementation of the automatic linking plan without user involvement so that the user is not required to know the rules for creating or nesting folders. A system defined attribute is used to indicate that the folder item was created by the present system. In addition, the present system automatically moves an item from one folder to another when the item is changed to a different type if the item was first added to the folder by the present system. When an item's attributes are changed or the item is redefined as a different type, the item is re-indexed. The present system then changes the item's link from the original folder to a new or different folder that matches the item's new attributes or definition. If no correspondence folder exists for this customer, the present system creates a new folder with the proper attributes. If the result of removing an item from a folder results in an empty folder and if the folder was originally created by automatic linking, the present system deletes the empty folder. When the present system creates a new folder, the "automatic linking" rules for that item type are checked by the present system. This process is executed recursively.

14 Claims, 5 Drawing Sheets

SYSTEM AND METHOD FOR AUTOMATICALLY LINKING ITEMS WITH MULTIPLE ATTRIBUTES TO MULTIPLE LEVELS OF FOLDERS WITHIN A CONTENT MANAGEMENT SYSTEM

CROSS-REFERENCE TO RELATED APPLICATION

This application is related to copending U.S. patent application Ser. No. 10/131,653, titled "Autofoldering Process In Content Management," filed on Apr. 23, 2002, which is assigned to the same assignee as the present application, and incorporated herein by reference.

FIELD OF THE INVENTION

The present invention generally relates to the field of organizing, inter-relating data files, and linking of content, in relational database management system models. More particularly, the present invention relates to a system and associated method for automatically linking items with multiple attributes to multiple levels of folders within a content management system.

BACKGROUND OF THE INVENTION

A "folder" is a named collection of related items that can be retrieved, moved, and otherwise manipulated as one entity. "Foldering" or "linking" is a process where a content management system manages and/or controls the creation, retrieval, editing and distribution of content within an information processing system. Foldering or linking is the act of forming a "link" relationship between two Items. Generally, the content management system enables an end user to create a folder in the content management system and file it into a library by interacting with a suitable application.

In one exemplary type of linking system, each item in the system may exist as the "source" and/or "target" for linking. The source would typically be thought of as a folder, and the target could be either a document or a folder. This relationship is maintained in a table known as a LINKS table.

Content management is an infrastructure to manage a wide spectrum of digital information. Large collections of scanned images, facsimiles, electronic office documents, XML and HTML files, computer output, audio, video, multimedia, and virtual reality content can be stored and accessed through the content management system. The content management system integrates content with line of business, customer service, enterprise resource planning, digital asset management, distance learning, Web content management or other applications to accelerate benefits across the enterprise.

The content manager product may be visualized as a triangle; its three vertices being the client, a library server and a resource manager. The client is the user's interface; it gives the user the capability of storing, searching for, and marking-up objects such as documents, files, etc. The library server is the equivalent of a card catalog that holds information about the objects, including their location. The resource manager (RM) is the storage location for either the actual object or a pointer to the actual object.

The core library server logic (except for system utilities and housekeeping tasks) is packaged as a set of relational database (RDB) stored procedures (SPs) containing embedded SQL statements. Each stored procedure (SP) is precompiled and runs on a relational database (RDB) server. Consequently, each Library Server (LS) process is a relational database (RDB) server process. Stored procedures (SPs) can be executed through the library server's SQL interface. The library server can be remotely accessed through a relational database (RDB) client.

The Resource Managers (RMs) may support different/multiple access protocols. The resource manager (RM) supports the HTTP protocol.

The basic information entities managed by the library server are "items." As used herein, the "items" can be categorized in two types, simple items and resource items. Resource items can have content associated with them that is stored in one or more resource managers. Resource items point to their content via resource URL-RELATED DATA.

The library server (LS) and resource manager (RM) are separate processes, often running on different machines. In operation, clients first contact the library server (LS) to create/update an index for an object, and to determine where the object is to be stored/replaced. The client then sends a request to the resource manager (RM) to store/replace the object Considering an example of a content management system with linking. An end user desires to view content objects from contents within the folder. The client sends a request to the library server to get the content of a folder. The library server returns to the client the identifiers of items contained in the folder. The client sends some or all of those identifiers back to the library server. The library server returns all attributes for each identifier to the client. The client then displays the list of items in the folder. The end user may select any item for further action such as display, removal from the folder, or other actions.

In prior content management systems with automatic linking, if the user task is to correctly add a document to a folder based on the value of more than one attribute, the client first searches for a folder of the required type with the required attribute values. If a folder of specified type and attribute is not found, the folder is created. The newly created document or folder is then added. This could create planning problems for the client, especially when dealing with large numbers of objects and documents.

These prior content management systems that automatically link documents are based on one attribute, and create folders to one level. They do not support automatic linking for multiple attributes within multiple layers of folders Thus, a need exists to extend the automatic linking process to items with multiple attributes and multiple levels of nested folders and to improve the performance of the existing automatic linking process.

SUMMARY OF THE INVENTION

The present invention satisfies this need and presents a linking system, a computer program product, and an associated method (collectively referred to herein as "the system" or "the present system") for automatically creating folders and for linking items with multiple attributes to multiple levels of folders within a content management system.

One feature of the present invention is that it extends automatic linking (auto linking or auto foldering) to support multiple levels of folders and multiple attributes. These attributes are used for searching for an existing folder of the specified type. If a folder is not found, the present system creates a folder. A row is added to the LINKS table in the library server with an item identification (ItemID).

Another feature of the present system is that it automatically moves an item from one folder to another when the item is changed to a different type if the item was first added to the folder by the present system.

Yet another feature of the present system is that it supplements the implementation of automatic linking plans without user's involvement, so that the user is not required to know the rules for creating or nesting folders.

When an item's attributes are changed, or the item is redefined as a different type, the item is re-indexed. The present system then changes the item's link from the original folder to a new or different folder that matches the item's new attributes or definition. For example, a customer letter is added to the customer's correspondence folder. Later, someone discovers that the wrong customer number was used. When the customer number is corrected, the present system moves the document from the original folder to the correct folder. If no correspondence folder exists for this customer, the present system creates a new folder with the proper attributes. If the result of removing an item from a folder results in an empty folder and if the folder was originally created by automatically linking, the present system deletes the empty folder.

When the present system creates a new folder, the "automatic linking" rules for that item type are checked by the present system. This process is executed recursively.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Attribute: a property or characteristic, and more particularly, a field in a database.

Item: The basic information entities managed by the Library Server. "Items" as used herein come in two types, simple items and resource items. An item can be, for example, a folder or a document.

Figure 1:
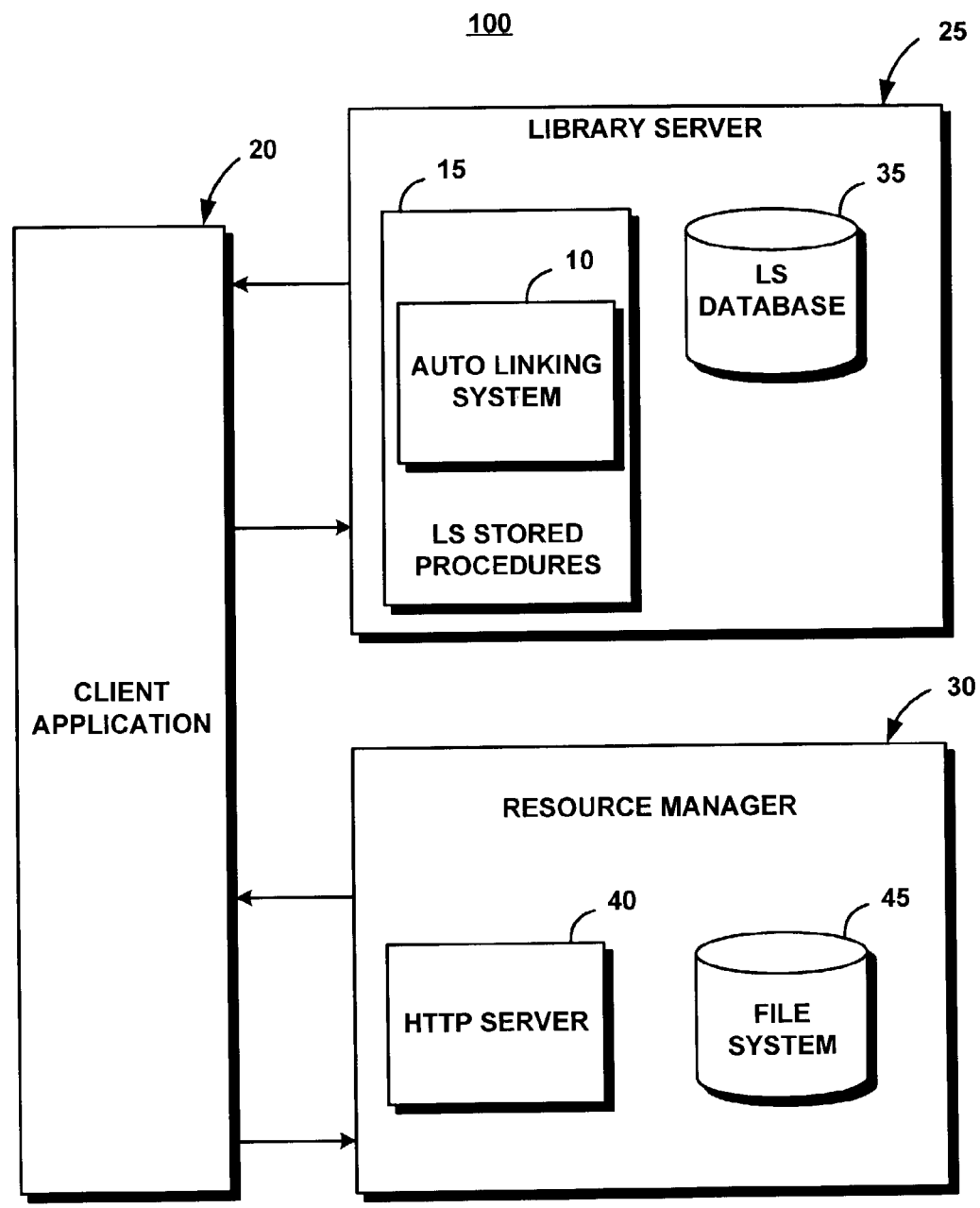
FIG. 1 is a schematic illustration of an exemplary operating environment in which a system and method for automatically linking items with multiple attributes to multiple levels of folders within a content management system of the present invention can be used.

FIG. 1 illustrates an exemplary high-level architecture of a content management system 100 comprising an automatic linking system 10 that supports items and folders with multiple attributes in addition to folders nested in multiple levels. The automatic linking system 10 can be a part of the LS Stored Procedures 15. The LS Stored Procedures 15 together with the automatic linking system 10 generally includes a software programming code or computer program product that is typically embedded within, or installed on a computer.

A client application 20, a library server 25, and a resource manager 30 interact to store an item. The library server 25 includes library server (LS)—stored procedures 30, a library server database 35. The resource manager 30 includes an HTTP server 40, and a file system 45.

At a high level, the client application 20 begins a transaction and returns confirmation to the end user. Next, the client application 20 establishes a connection to the library server 25, and sends requests to the library server 25 to create a catalog entry (as an index entry) for a content management object. In response, the client application 20 receives information back from the library server 25 regarding the storage location for the object.

The client application 20 then sends a request to the resource manager 30 to store the object, and receives a response therefrom with the object metadata. This metadata includes, by way of example, the object name, size, and creation timestamp. The client application 20 sends this metadata to the library server 25.

Within the broader concept of content management, the present invention provides a system and associated method of filing a document as a folder in an information processing system, to manage a group of documents contained in the folder. An end user indicates to the content management system 100 that an item is to be created as a folder. A number of documents are identified that are to be included in the folder document. A logical relationship is then specified for the identified documents. The identified documents are then filed in the folder. Thereafter, the folder is filed in the information processing system.

The document management system controls the creation, retrieval, editing and distribution of documents within a content management system 100. The content management system 100 enables an end user to create an item that includes a plurality of identified documents stored therein. The created item is referred to as a folder.

The identified documents are organized in a linear and hierarchical manner. Subsequent operations can be performed on the entire folder. In essence, the folder and all of the documents contained within the folder can be retrieved or printed by referring only to the folder. The end user or administrator does not specify the folders to be created. He or she creates the item type, and the client application creates the items (i.e., documents or folders) within this item type. Subsequent operations involving the folder created can be performed on the entire folder without retrieving all of the individual documents stored therein.

Figure 2:
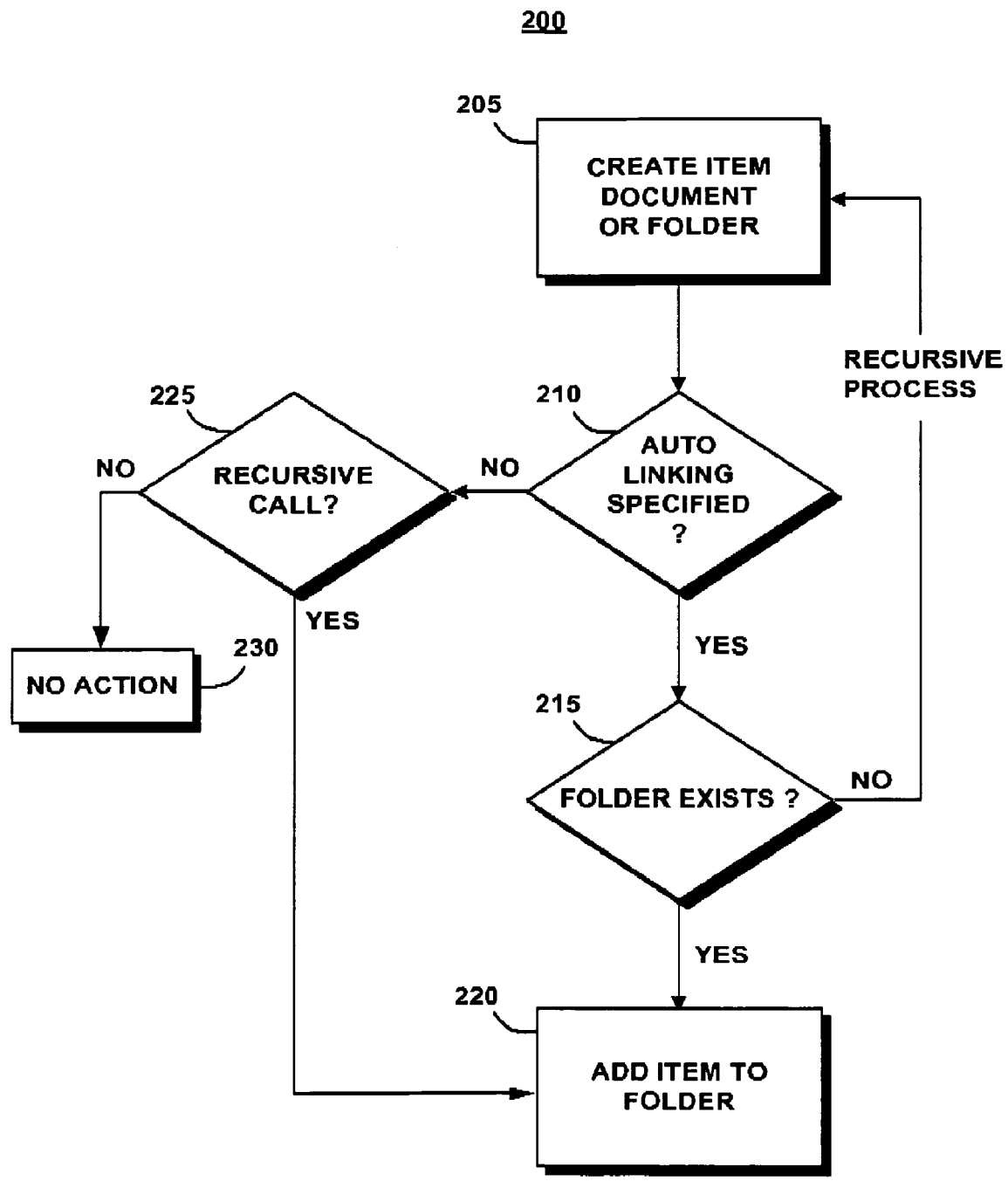
FIG. 2 is a process flow chart illustrating a method of operation of the automatic linking system of FIG. 1.

FIG. 2 illustrates a method of operation 200 of the automatic linking system 10. At block 205, the library server 25 creates the item for the document/folder. The automatic linking system 10 then determines at decision block 210 whether automatic linking is specified for this document or folder.

Automatic linking is specified for item types by the system administrator. When the system administrator creates an item type, he specifies the automatic linking rules for that item type. These rules are stored in a separate table in the library server.

If automatic linking has been specified, the automatic linking system 10 determines at block 215 if a folder of the required item type exists. The library server 25 (FIG. 1) performs a query to determine if a folder of the desired item type exists.

If such a folder is found to exist, the automatic linking system 10 adds the document or folder to the folder at block 220. If not, the automatic linking system 10 returns to block 205 and creates a new folder to match the required item type.

The automatic linking system 10 repeats blocks 205 to 215 recursively until a folder with the desired attributes has been created. At each iteration, the automatic linking system 10 proceeds through blocks 210 and 215, inserting the original document or folder in the new folder. A row is added to the LINKS table in the library server with the ItemIDs, indicating that the item was added to the folder via automatic linking. A cycle is when the rules would try to create the situation where Folder A contains B which contains C which contains A.

When the automatic linking system 10 creates a new folder, the "automatic linking" rules for that item type are checked by the present system at decision block 210. If no automatic linking rules are specified for that document or folder created at block 205, the automatic linking system 10 proceeds to decision block 225. At decision block 225, the automatic linking system 10 determines whether the last folder created at block 205 was from a recursive call. If yes, the automatic linking system 10 proceeds to block 220 and adds the current item to the folder. If not, system 10 takes no action (block 230).

Figure 3A:
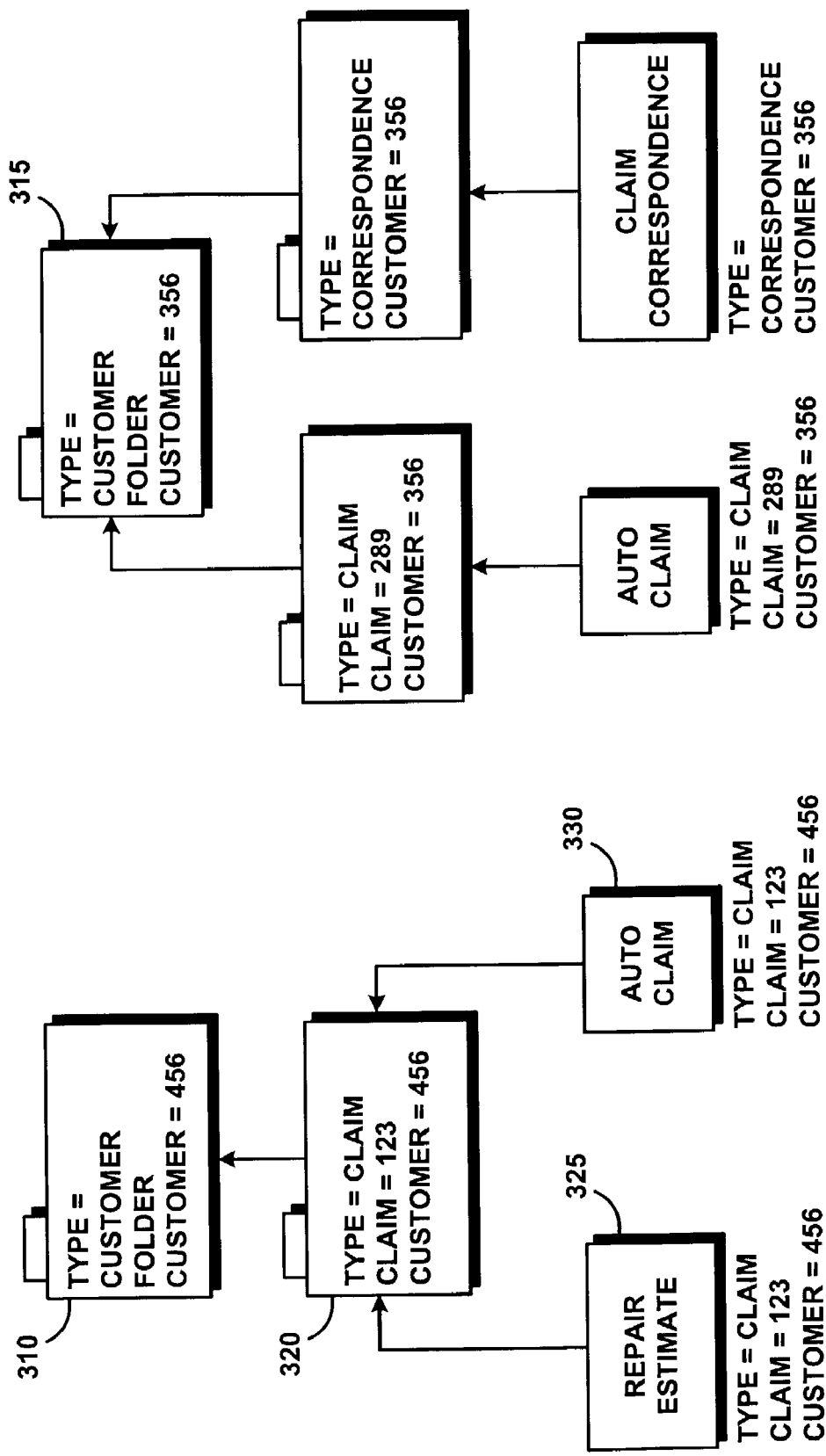
FIG. 3 is comprised of FIGS. 3A, 3B, 3C, and represents a schematic illustration portraying the operation of the automatic linking system of FIGS. 1 and 2 within a content management system.
Figure 3B:
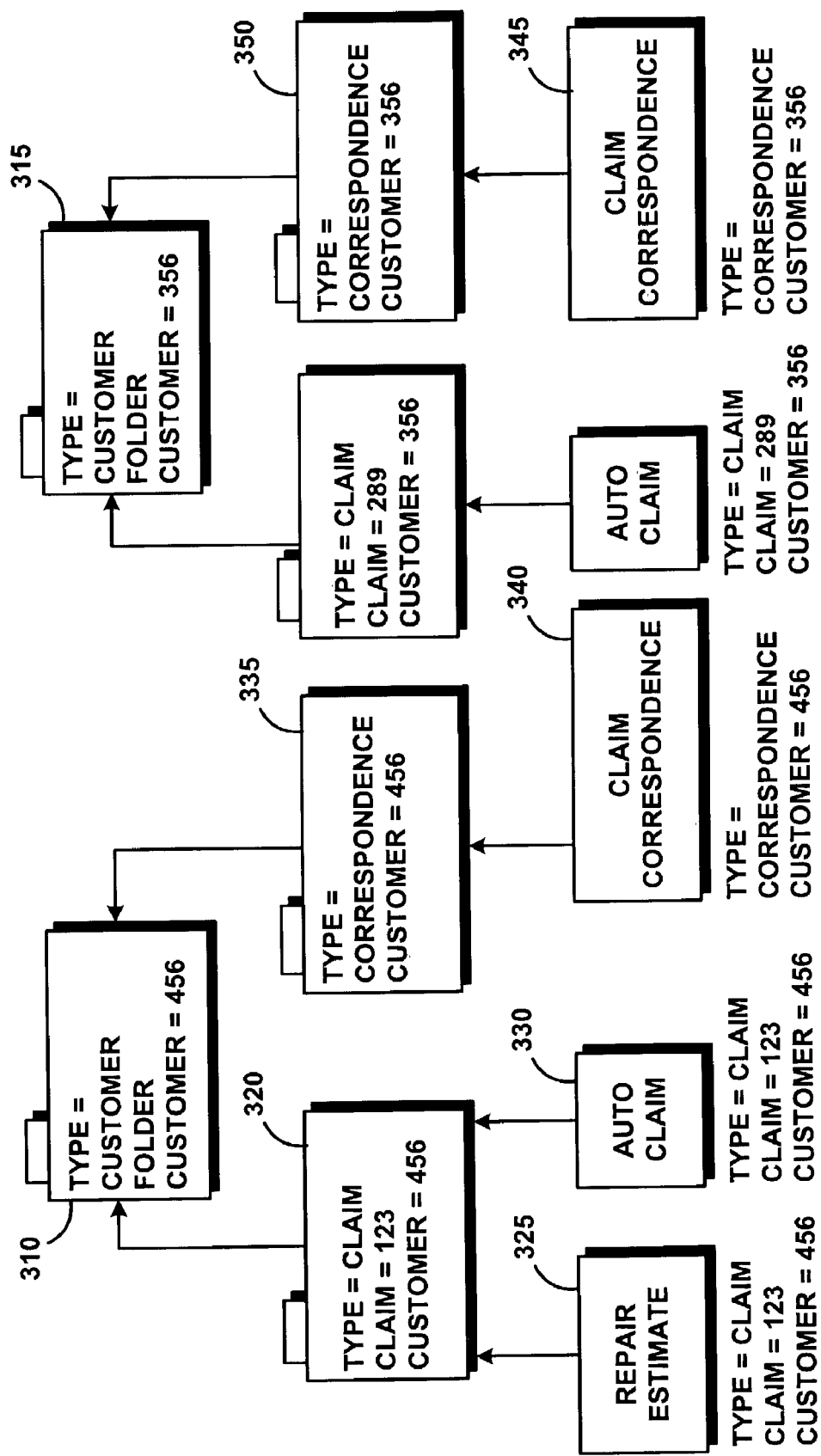

An automatic linking example is shown in FIGS. 3A and 3B. The user is an insurance company that wishes to save documents pertaining to customers within a predefined folder hierarchy. The system administrator defines the top level of the hierarchy as customer folder 305, shown in FIG. 3A.

Customer folder 305 has one attribute, type="customer folder". Within the customer folder 305 are folders for each customer, such as folder 310 and 315. Folder 310 has two attributes, type="customer folder" and customer=456. Folder 315 has similar attributes, type="customer folder" and customer=356. Within folder 310 resides folder 320 with attributes type="claim", claim=123, and customer=456. Two documents have been stored in folder 320, property claim 325, and automatic claim 330. A similar hierarchy exists for documents stored for other customers.

The user wishes to save a claim correspondence document for the customer whose ID is 456. The library server 25 creates the item attributes for the claim correspondence document at block 205, giving the document the following attributes:
type="correspondence".
customer=456.

At block 210 of FIG. 2, the automatic linking system 10 checks to see if automatic linking rules have been specified. The response in this example is affirmative, and the automatic linking system 10 proceeds to block 215 to locate the appropriate folder. The library server performs a query to find a suitable folder at block 215. No folder exists matching these attributes. Consequently, the library server 25 creates a folder 335 with the following attributes:
type="correspondence", and
customer=456, as seen in FIG. 3B. The folder 335 can be viewed, for example as a target folder, and the folder 310 can be viewed, for example, as a source item type (though such a distinction or classification is not necessary), and the claim correspondence is placed in folder 310 as shown by claim correspondence 340.

The content management system 100 now has two folders per customer, one for the claims and one for the correspondence. In previous content management systems, the library server supported only one attribute per item and only one folder per customer, and it was the user's responsibility to search for the folder and to create the folder if it didn't exist. This is no longer the case with the present invention in that the automatic linking system 10 automatically creates folders and maintains the folder hierarchy.

Figure 3C:
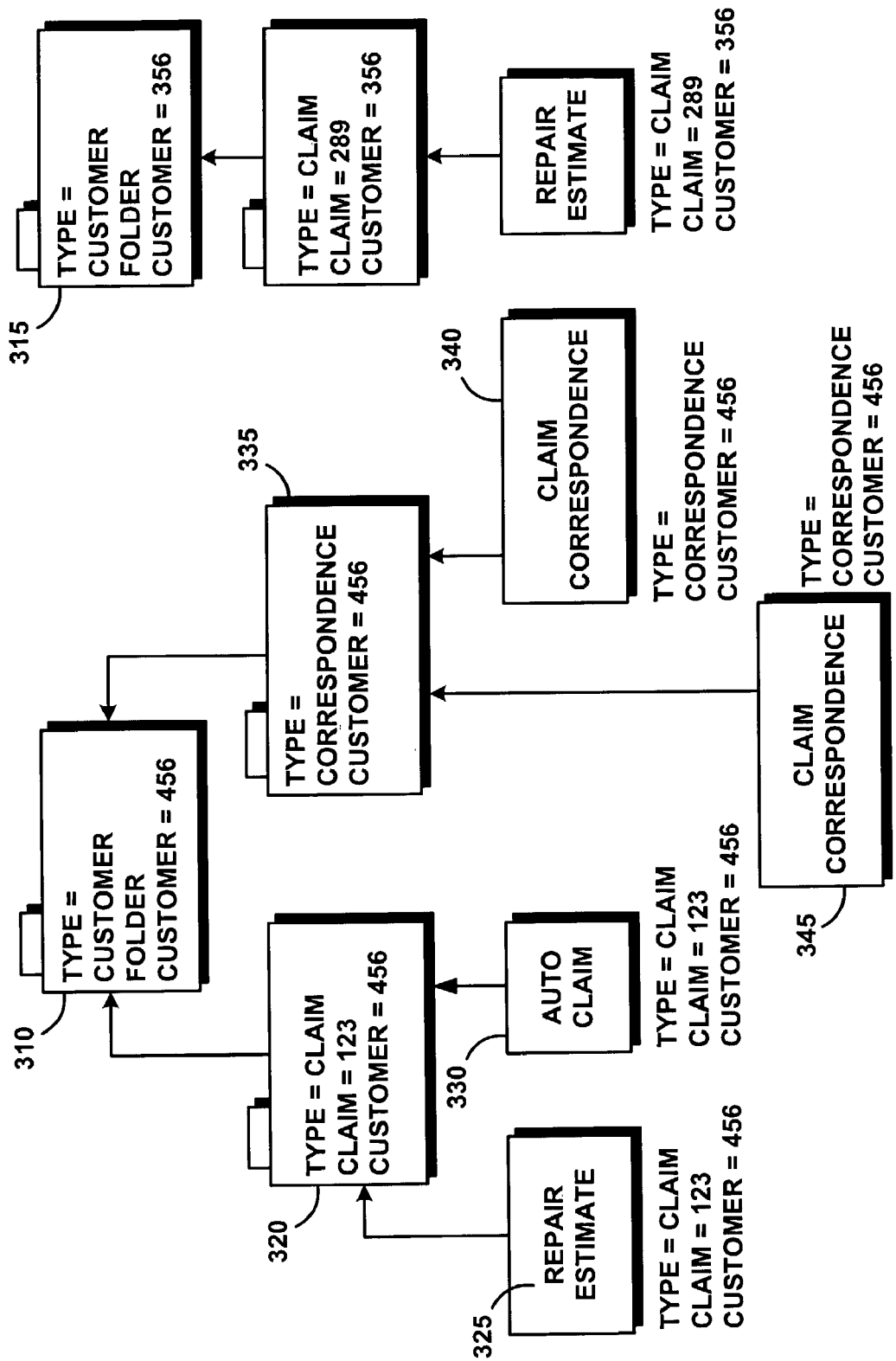

The automatic linking system 10 will move documents from one folder to another if the attributes are changed or the item is redefined as a different type even when that item is located in a folder hierarchy several layers deep. For example, in FIG. 3B, the user has identified claim correspondence 345 with customer ID=356. When reviewing claim correspondence 345, the user finds that the customer ID was entered incorrectly and corrects the customer ID to 456. The attributes for claim correspondence 345 no longer match the folder attributes, so the automatic linking system 10 moves claim correspondence 345 to folder 335, as shown in FIG. 3C. Since 350 with type="correspondence" and customer=356 is now empty, the automatic linking system 10 deletes folder 350.

It is to be understood that the specific embodiments of the invention that have been described are merely illustrative of certain application of the principle of the present invention. Numerous modifications may be made to the system and method for automatically linking items with multiple attributes to multiple levels of folders within a content management system invention described herein without departing from the spirit and scope of the present invention.

What is claimed is:

1. A method of automatically linking items with two or more attributes to multiple, different levels of folders in a content management system, comprising:
   creating a plurality of item types for the folders in the content management system;
   linking the items to the folders by recursively and automatically performing the following steps for each item:
      determining whether automatic linking is specified for the item;
      upon determination that automatic linking is specified for the item, determining whether an existing folder of an associated item type is specified, and identifying a level of the multiple levels that is associated with the existing folder;
      upon determination that the existing folder is specified, automatically adding the item to the existing folder at the identified level; and
      upon determination that the existing folder is not specified, automatically creating a new folder associated with the item type and identifying the level associated with the new folder, and adding the item to the new folder at the identified level.

2. The method of claim 1, wherein determining whether automatic linking is specified for the folder comprises further determines whether automatic linking rules have been specified.

3. The method of claim 2, wherein upon determination that the automatic linking rules have been specified, locating the existing folder.

4. The method of claim 3, further comprising using the attributes of the item for locating the existing folder of the associated item type.

5. The method of claim 1, further determining whether any one or more of the attributes and the associated item type of the item has changed.

6. The method of claim 5, wherein upon determination of a change in any one or more of the attributes and the associated item type of the item, removing the item from the folder containing the item to another folder at one of the multiple levels; and wherein upon determination that the removal of the item from the folder containing the item results in an empty folder, automatically deleting the empty folder.

7. A computer program product having a plurality of executable instruction codes stored on a computer-useable medium for automatically linking items with two or more attributes to multiple, different levels of folders in a content management system, comprising:

a set of instruction codes for creating a plurality of item types for the folders in the content management system;

a set of instruction codes for linking the items to the folders by recursively and automatically performing the following steps for each item:

determining whether automatic linking is specified for the item;

upon determination that automatic linking is specified for the item, determining whether an existing folder of an associated item type is specified, and identifying a level of the multiple levels that is associated with the existing folder;

upon determination that the existing folder is specified, automatically adding the item to the existing folder at the identified level; and upon determination that the existing folder is not specified, automatically creating a new folder associated with the item type and identifying the level associated with the new folder, and adding the item to the new folder at the identified level.

8. The computer program product of claim 7, further comprising a third set of instruction codes for using the attributes of the item locating the existing folder of the associated item type.

9. The computer program product of claim 7, further comprising a set of instruction codes for determining whether any one or more of the attributes and the associated item type of the item has changed.

10. The computer program product of claim 9, further comprising:

a set of instruction codes, which, upon determination of a change in any one or more of the attributes and the associated item type of the item, removes the item from the folder containing the item to another folder at one of the multiple levels; and a set of instruction codes, which, upon determination that the removal of the item from the folder containing the item results in an empty folder, automatically deletes the empty folder.

11. A system that automatically links items with two or more attributes to multiple, different levels of folders in a content management system, comprising:

means for creating a plurality of item types for the folders in the content management system;

means for linking the items to the folders by recursively and automatically performing the following steps for each item:

determining whether automatic linking is specified for the item;

upon determination that automatic linking is specified for the item, determining whether an existing folder of an associated item type is specified, and identifying a level of the multiple levels that is associated with the existing folder;

upon determination that the existing folder is specified, automatically adding the item to the existing folder at the identified level; and upon determination that the existing folder is not specified, automatically creating a new folder associated with the item type and identifying the level associated with the new folder, and adding the item to the new folder at the identified level.

12. The system of claim 11, further comprising means for locating the existing folder of the associated item type using the attributes of the item.

13. The system of claim 11, further comprising means for determining whether any one or more of the attributes and the associated item type of the item has changed.

14. The system of claim 13, means for removing the item from the folder containing the item to another folder at one of the multiple levels upon determination of a change in any one or more of the attributes and the associated item type of the item; and means for automatically deleting the empty folder upon determination that the removal of the item from the folder containing the item results in an empty folder.

* * * * *